POSTPAY TELEPHONE PAYSTATION CIRCUIT
Filed Feb. 1, 1967
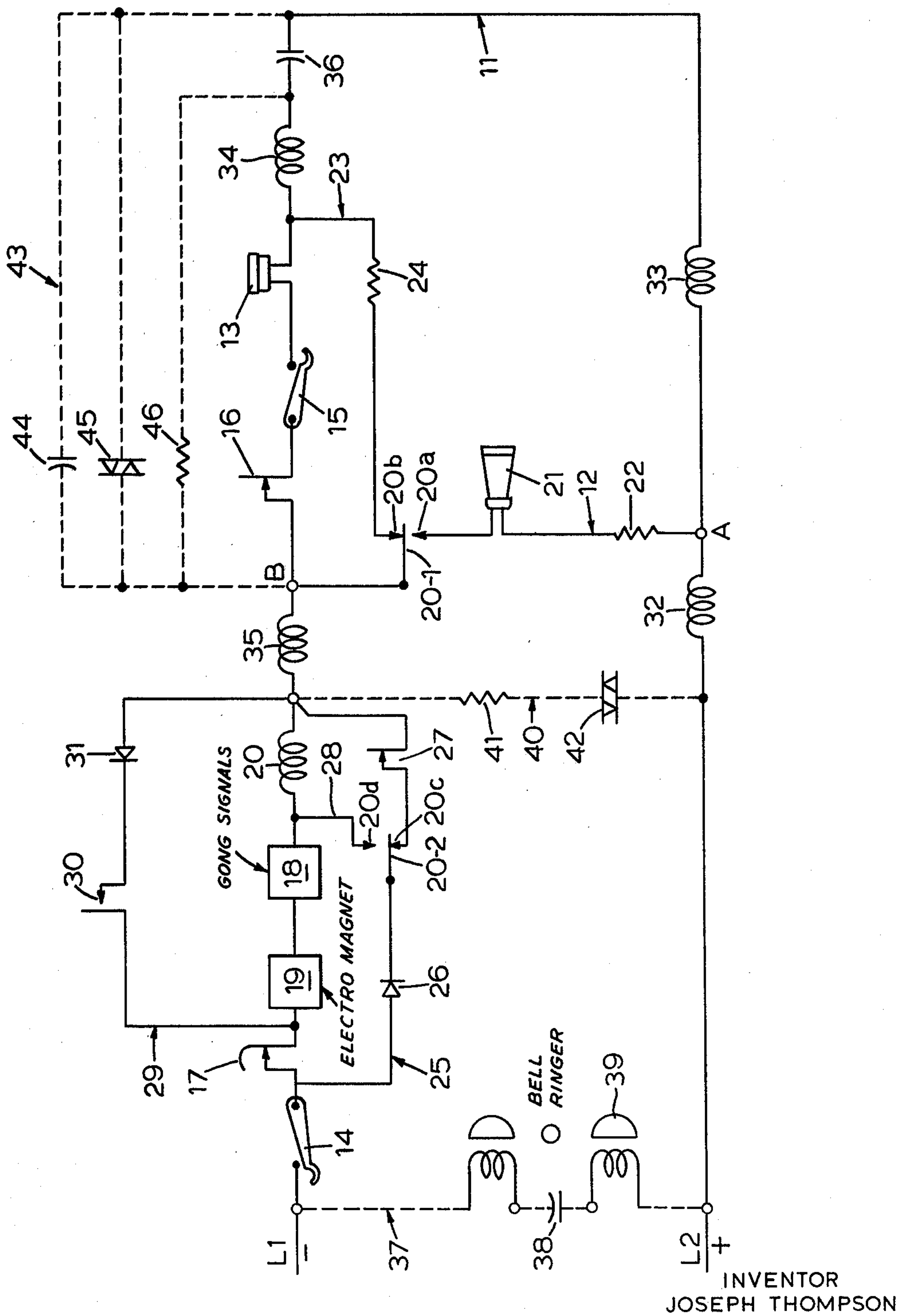
INVENTOR
JOSEPH THOMPSON
BY Westell & Hanley United States Patent Office 3,474,193
Patented Oct. 21, 1969

3,474,193

POSTPAY TELEPHONE PAYSTATION CIRCUIT

Joseph Thompson, Glanworth, Ontario, Canada, assignor to Northern Electric Company Limited, Montreal, Quebec, Canada Filed Feb. 1, 1967, Ser. No. 613,241
Int. Cl. H04m 17/02
U.S. Cl. 179—6.3 7 Claims

ABSTRACT OF THE DISCLOSURE

A postpay telephone paystation circuit in which a call can be placed without depositing any coins until the called party answers. A reed relay coil is connected in series with the receiver and transmitter circuits and on reversal of normal line polarity the reed relay contacts open the transmitter circuit until the required coins are deposited which returns the transmitter to normal operating condition.

The present invention relates to a telephone paystation circuit and more particularly to a postpay type of paystation circuit.

In the postpay type of telephone paystation circuit the receiver may be taken off the hook and normal dialing may be effected without first depositing a coin or coins. However, on completion of the circuit by the person being called, the voice transmitter at the paystation is rendered inoperative until an appropriate deposit is made by the calling party. This is accomplished through a Strowger Exchange in which a battery reversal is effected from the central office to the paystation when the called party lifts the receiver. On battery reversal, the current is shunted around the transmitter until the shunt is removed by the deposit of a coin. As shown for instance in United States Patent No. 3,046,341 issued July 24, 1962 in the name of N. J. Murphy or United States Patent No. 3,155,793 issued Nov. 3, 1964 in the name of C. Aikawa et al., either the circuit or the coin mechanism to achieve this purpose is complex, resulting in costly manufacture, especially of the mechanical units, and consequent difficulty in adjustment, reliability and maintenance.

Applicant has previously developed a circuit arrangement, which is the subject matter of United States patent application Serial No. 491,777 filed Sept. 30, 1965, simplifying the complexity of this type of circuit by employing a reed switch in association with a simple coin mechanism. However, in that development extra resistance was introduced into the transmitter circuit in the form of an electromagnetic relay and a relatively high balancing resistance, thus requiring greater current for operation of the circuit.

It is an object of the present invention to provide a telephone paystation of the postpay type having an improved circuit arrangement.

It is a further object of the invention to provide a postpay telephone circuit arrangement which reduces current requirements for its operation.

Another object of the invention is to provide a postpay telephone circuit requiring less maintenance and having a longer life.

The invention in its broadest aspect consists of a postpay telephone paystation circuit of the direct current reversing type having a voice receiver circuit and a normally open voice transmitter circuit in parallel therewith, a non-latching reed relay having a coil in series with the receiver circuit and with the transmitter circuit, a normally closed by-pass circuit shunting the relay including a rectifier connected and poled to pass current only in the direction caused by reverse line polarity across the series circuit, and means actuable on deposit of a coin or coins to open the by-pass circuit, the relay being connected (1) to close the transmitter circuit and open the by-pass circuit on passage of current in the direction of normal line polarity in the receiver circuit, (2) to be de-energized on transition in the circuits from normal to reverse line polarity whereby the transmitter circuit is opened and the by-pass circuit is closed, and (3) to close the transmitter circuit and maintain the by-pass circuit open subsequent to operation of the coin-actuated means.

Preferably the paystation circuit includes a second normally closed by-pass circuit shunting the receiver of the receiver circuit and having a resistance in series therein, the relay being connected (1) to open the second by-pass circuit on passage of current in the direction of normal line polarity in the receiver circuit (2) on de-energization to close the second by-pass circuit, and (3) to open the second by-pass circuit subsequent to operation of the coin-actuated means. A relay suitable for use in the paystation circuit is a double pole, double throw reed relay.

The accompanying drawing is a schematic diagram of an example embodiment of a telephone paystation circuit of the postpay type incorporating the present invention.

Referring to the circuit diagram of the drawing, $L_1$ and $L_2$ are direct current line conductors leading from the central office of the paystation (Strowger Exchange), $L_2$ being normally of higher potential than $L_1$, hereinafter referred to as normal (non-operating) line polarity. The paystation circuit consists of a voice receiver circuit 11 connected in series with line conductors $L_1$ and $L_2$ at Terminals A and B and a voice transmitter circuit 12 connected in parallel with receiver circuit 11 across line conductors $L_1$ and $L_2$ at terminals A and B.

Voice receiver circuit 11 includes in series a voice receiver 13, a hook switch 15 (normally open when receiver 13 is at rest) and a normally closed dial switch 16. In series with receiver circuit 11 is a second normally open hook switch 14, a normally closed pulse switch 17, a gong signal transmitter 18, and an electromagnet 19 (the gong signal transmitter and the electromagnet being of use only for toll calls and not for normal postpay operation). Also in series with the receiver circuit 11 is the coil of a double pole, double throw reed relay 20 having a pair of ganged contact poles or arms 20–1 and 20–2. Reed relay 20 is non-latching, i.e. it is electromagnetic only and requires sustained current for continuing operation.

Voice transmitter circuit 12 includes in series a voice transmitter 21, a resistance 22 and one normally open pair of contacts **20*a* associated with pole 20–1 of reed relay 20**.

In parallel with voice receiver 13, hook switch 15 and dial switch 16 is a normally closed by-pass circuit 23 having in series a normally closed pair of contacts **20*b* associated with pole 20–1 of relay 20 and a small resistance 24, say 10 ohms. In parallel with relay 20, gong signal transmitter 18, electromagnet 19 and dial pulse switch 17 is a normally closed by-pass circuit 25 having in series a rectifier 26, a normally closed pair of contacts 20*c* associated with pole 20–2 of relay 20 and a normally closed coin switch 27. Rectifier 26 opposes normal line polarity, i.e. it passes current only in the direction of reverse line polarity. A line 28 is alternately connected through a normally open pair of contacts 20*d* associated with pole 20–2 of relay 20 in series with rectifier 26 providing a by-pass around dial pulse switch 17, electromagnet 19 and gong signal transmitter 18**.

A line 29 by-passes relay 20, gong signal transmitter 18 and electromagnet 19 and has in series a normally open dial shunt switch 30 and a rectifier 31 which passes current only in the direction of normal line polarity.

Other elements included in the paystation circuit are: coils 32, 33, 34 and 35 in series in line conductors $L_1$ and $L_2$ and in circuit 11 which are transformer windings on a common core adapted to achieve side tone balancing; a capacitance 36 in circuit 11 to remove direct current from that circuit; and a bell ringer circuit 37 across line conductors $L_1$ and $L_2$ including a capacitance 38 and a ringer 39. A power stabilizing circuit 40, having in series a resistor 41 and a varistor 42, is connected in parallel with the receiver and transmitter circuits 11 and 12. A side tone balancing circuit 43, having a series capacitor 44, is connected in parallel with capacitor 36, coil 34, hook switch 15 and dial switch 16. Circuit 43 includes a varistor 45 in parallel with capacitor 44 and a resistor 46 in series with capacitance 36.

In the operation of the circuit, line conductor $L_1$ is normally of negative potential and line conductor $L_2$ is normally of positive potential when the line is non-operating, and hook switches 14 and 15 are open while the handset is at rest. A party wishing to make a call at the paystation removes the handset from its hook and this closes hook switches 14 and 15 while applying normal line potential and a dial tone to the paystation set. Under this normal line potential the current flows through the loop of the paystation set from line conductor $L_2$ through varistors 42 and 45 to line conductor $L_1$, (capacitance 36 blocks the direct current from passing through receiver 11 itself) energizing relay 20 and causing it to operate. Operation of relay 20 closes voice transmitter circuit 12 through contacts 20*a* and removes by-pass circuit 23 from receiver 13. Operation of relay 20 also closes contacts 20*d* but this has no effect since rectifier 26 prevents any flow of current through by-pass circuit 25.

Lifting of the hand set and establishment of the above mentioned current flow is followed by dialing which opens dial switch 16 to prevent clicking on the line and closes dial shunt switch 30. Rectifier 31 allows flow of current through by-pass circuit 29 causing relay 20, gong signal transmitter 18 and electromagnet 19 to be shunted, thus preventing dial pulse distortion caused by the coil of relay 20 and electromagnet 19.

It will be appreciated that in the above condition of the paystation circuit the calling party can place a call in the manner of a subscriber without depositing any coins. However, when the called party lifts his or her receiver or hand set, reversal of line potential to the paystation is effected at the central office and line conductor $L_1$ assumes a higher potential than line conductor $L_2$. As explained above, this particular system of reversing line polarity is known as a Strowger Exchange. As line polarity is reversed, relay 20 is momentarily de-energized and contacts 20*a*, 20*c* are restored to their closed positions as shown in the drawings. Rectifier 26 in by-pass circuit 25 now allows current to be shunted around relay 20, gong signal transmitter 18 and electromagnet 19. The de-energization of electromagnet 19 ensures that coin switch 27 remains closed until the minimum amount of coinage is deposited. Also, voice transmitter circuit 12 is opened while current is shunted around voice receiver 13 by circuit 23, thus preventing transmission and reducing reception by the calling party.

If the required coin (or coins) is now deposited by the calling party it acts to open coin switch 27 momentarily when passing into a collection hopper (not shown). By-pass circuit 25 is thus opened and current again flows through electromagnet 19, gong signal transmitter 18 and relay 20, re-energizing relay 20 and causing it to operate. Consequent closing of contacts 20*d* ensures continuous current flow through relay 20, through rectifier 26 and line 28 while gong signal transmitter 18 and electromagnet 19 continue to be shunted. Also, pulse switch 17 is shunted to prevent reversal of the line conductors for illegal use of the paystation. The simultaneous closing of contacts 20*a* completes voice transmitter circuit 12 and returns the transmitter to normal operating condition while by-pass circuit 23 is opened to restore voice receiver 13 to normal operating condition. This condition of voice receiver circuit 11 and voice transmitter circuit 12 prevails during conversation between the parties.

When the call has been terminated by the called party replacing this receiver or handset in its normal position of rest to open the associated hook switches, normal line potential is restored in the paystation circuit through the central office, i.e. line conductor $L_2$ reverts to a higher potential than line conductor $L_1$. The same effect is achieved if the calling party replaces the paystation handset to open hook switches 14 and 15.

The use of a reed relay in the circuit of the present invention has a number of advantages. Firstly the speed of operation of such a relay is much higher than that of a standard relay and enables the voltage reversal in the paystation loop to be utilized. The speed of operation of a reed relay is approximately 0.003 second whereas the time for the voltage to be reversed is in the neighbourhood of 0.1 second, which leaves ample time for de-energization of the relay. Secondly, the resistance of the coil in a reed relay (less than 75 ohms) is considerably lower than that of a standard relay. This enables the reed relay to operate on a low current (10 milliamperes) which is well below that sufficient to operate the remainder of the paystation circuit whereas a standard relay would demand more current that that required to operate the remainder of the circuit. Thirdly, a reed relay is particularly useful for long loop circuits having a high resistance since it does not require frequent adjustment under such line conditions. Finally, a reed relay is highly reliable and has a long life expectancy (25 years) at full load rating.

It will be appreciated that the present invention affords a compact, reliable and inexpensive paystation unit by replacing bulky and complex mechanical types of relay presently in use in prepay and postpay telephone paystations. Moreover, low resistances in the circuit enable the full transmission capabilities of the system to be utilized.

I claim:

1. In a postpay telephone paystation circuit of the direct current reversing type having a voice receiver circuit and a normally open voice transmitter circuit in parallel therewith, a non-latching reed relay having a coil in series with the receiver circuit and with the transmitter circuit, a normally closed by-pass circuit shunting said relay including a rectifier connected and poled to pass current only in the direction caused by reverse line polarity across said series circuit, and means actuable on deposit of a coin or coins to open said by-pass circuit, said relay being connected (1) to close said transmitter circuit and open said by-pass circuit on passage of current in the direction of normal line polarity in said series circuit, (2) to be de-energized on transition in said circuits from normal to reverse line polarity whereby said transmitter circuit is opened and said by-pass circuit is closed, and (3) to close said transmitter circuit and maintain said by-pass circuit open subsequent to operation of said coin-actuated means.

2. A device as claimed in claim 1 including a second normally closed by-pass circuit shunting the receiver of said receiver circuit and having a resistance in series therein, said relay being connected (1) to open said second by-pass circuit on passage of current in the direction of normal line polarity in said receiver circuit, (2) on de-energization to close said second by-pass circuit, and (3) to open said second by-pass circuit subsequent to operation of said coin-actuated means.

3. A device as claimed in claim 1 in which the reed relay is a double pole, double throw relay.

4. A device as claimed in claim 1 in which the coin-actuated means comprises a mechanically operated switch in series in said by-pass circuit.

5. In a postpay telephone paystation circuit of the direct current reversing type having a voice receiver circuit and a normally open voice transmitter circuit in parallel therewith, a double pole double throw non-latching reed relay having a coil in series with the receiver circuit and with the transmitter circuit, a first by-pass circuit shunting said relay including a rectifier connected and poled to pass current only in the direction caused by reverse line polarity across said series circuit, one pole of said relay being connected to normally close said first by-pass circuit, a second by-pass circuit shunting the receiver of said receiver circuit and having a resistance in series therein, the other pole of said relay being connected to normally close said second by-pass circuit, and a coin-actuating switch in series in said first by-pass circuit, whereby (1) on passage of current in the direction of normal line polarity said relay is energized, said transmitter circuit is closed and said second by-pass circuit is opened, (2) on transition in said circuits from normal to reverse line polarity said relay is de-energized, said transmitter circuit is opened, said first by-pass circuit is closed and said second by-pass circuit is closed, and (3) subsequent to operation of said coin-actuated switch said transmitter circuit is closed, said first by-pass circuit is maintained open and said second by-pass circuit is opened.

6. A device as claimed in claim 5 including an electromagnetic and gong signal transmitter in series with said relay and shunted by said first by-pass circuit, and in which said one pole of said relay when operating connects with a line to form a by-pass circuit shunting said electromagnet and said gong signal transmitter but not said relay.

7. A device as claimed in claim 5 including a dial pulse switch in series with said relay and shunted by said first by-pass circuit, and in which said one pole of said relay when operating connects with a line to form a by-pass circuit shunting said dial pulse switch but not said relay.

References Cited

UNITED STATES PATENTS

| | | | |
|---|---|---|---|
| 1,855,074 | 4/1932 | Vigren | 179—6.3 |
| 2,041,164 | 5/1936 | Sandalls | 179—6.3 |

FOREIGN PATENTS

| | | |
|---|---|---|
| 611,163 | 10/1948 | Great Britain. |

KATHLEEN H. CLAFFY, Primary Examiner

JAN S. BLACK, Assistant Examiner